United States Patent
Klitgaard et al.

(10) Patent No.: US 10,316,817 B2
(45) Date of Patent: Jun. 11, 2019

(54) WIND TURBINE BLADE AND AN ASSOCIATED MANUFACTURING METHOD

(71) Applicant: LM WP PATENT HOLDING A/S, Kolding (DK)

(72) Inventors: Michael Klitgaard, Odense S (DK); Christian Frank Andersen, Kolding (DK); Morten Ravn, Kolding (DK); Casper Skovby, Roskilde (DK); Simon Berg Bojesen, Bilund (DK); Peter Baek, Jelling (DK)

(73) Assignee: LM WP PATENT HOLDING A/S, Kolding (DK)

( * ) Notice: Subject to any disclaimer, the term of this patent is extended or adjusted under 35 U.S.C. 154(b) by 69 days.

(21) Appl. No.: 15/307,174

(22) PCT Filed: Apr. 28, 2015

(86) PCT No.: PCT/EP2015/059184
§ 371 (c)(1),
(2) Date: Oct. 27, 2016

(87) PCT Pub. No.: WO2015/165893
PCT Pub. Date: Nov. 5, 2015

(65) Prior Publication Data
US 2017/0051718 A1   Feb. 23, 2017

(30) Foreign Application Priority Data

May 1, 2014   (GB) .................................. 1407671.5

(51) Int. Cl.
*F03D 1/06*   (2006.01)
*B29D 99/00*   (2010.01)
(Continued)

(52) U.S. Cl.
CPC .............. *F03D 1/065* (2013.01); *B29C 70/34* (2013.01); *B29C 70/342* (2013.01);
(Continued)

(58) Field of Classification Search
CPC .......... A61F 13/15593; A61F 13/49012; A61F 13/49014; A61F 13/15674;
(Continued)

(56) References Cited

U.S. PATENT DOCUMENTS

| 5,088,665 A | 2/1992 | Vijgen |
| 2004/0115060 A1 | 6/2004 | Grabau et al. |

FOREIGN PATENT DOCUMENTS

| DK | 73796 A | 7/1996 |
| EP | 1780407 A2 | 5/2007 |

(Continued)

*Primary Examiner* — Vishal I Patel
(74) *Attorney, Agent, or Firm* — Nath, Goldberg & Meyer; Jerald L. Meyer; Tanya E. Hankins

(57) ABSTRACT

A manufacturing method is described for a wind turbine blade, where layers of fiber material are laid up in a mold to form a portion of the blade structure. The fiber layers are infused with a resin which is subsequently cured to form the hardened blade structure. Some of the layers of fiber material are arranged so that a portion of the layers are kept resin-free during the infusion and curing steps, so that the fiber layer extends freely out from the external surface of the blade, preferably at the blade trailing edge, to provide a flexible blade trailing edge to reduce blade operational noise.

9 Claims, 4 Drawing Sheets

Figure 1:
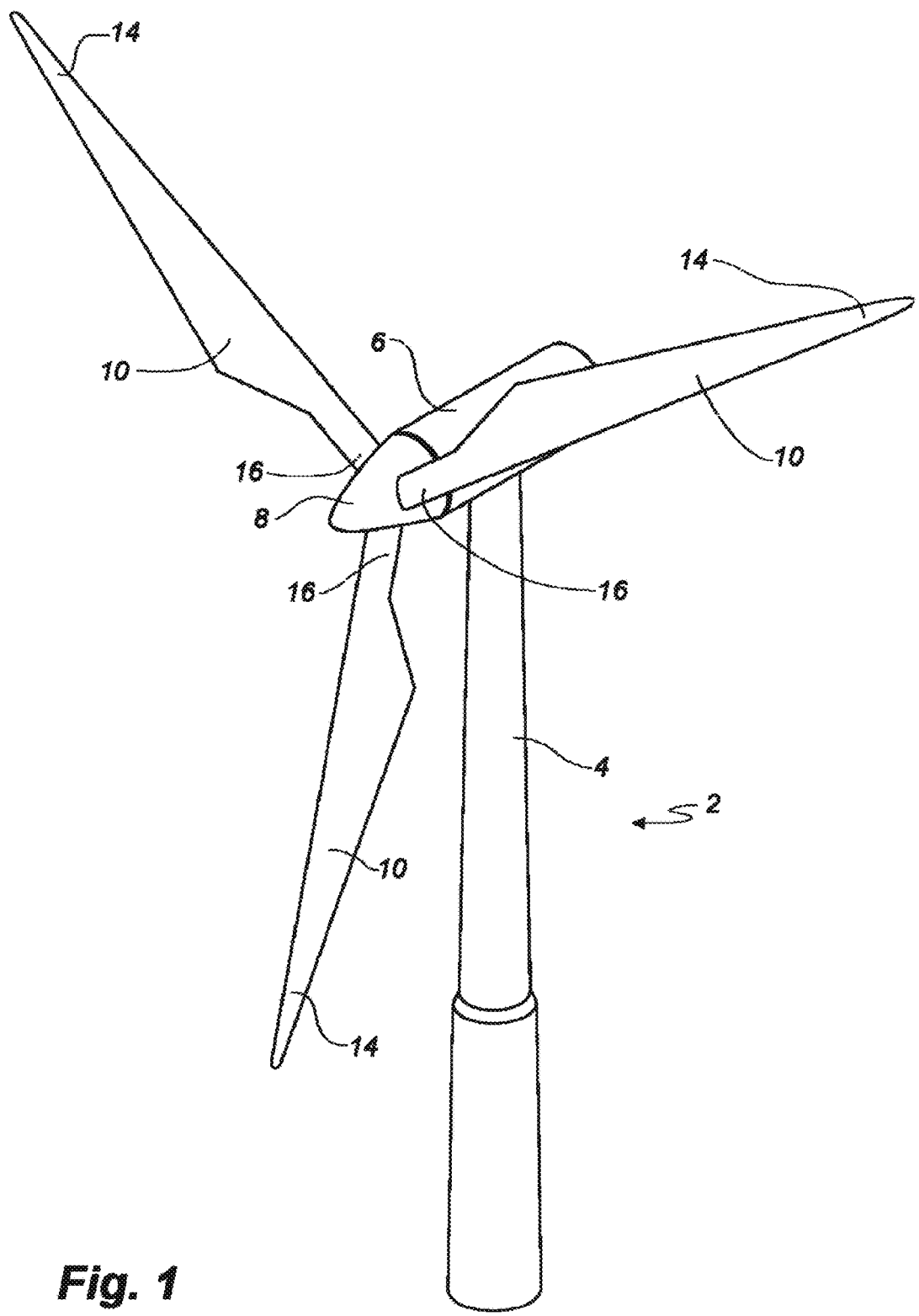

(51) Int. Cl.

| | |
|---|---|
| *B29C 70/34* | (2006.01) |
| *B29C 70/44* | (2006.01) |
| *B29C 70/54* | (2006.01) |
| *B29L 31/08* | (2006.01) |

(52) U.S. Cl.
CPC .......... *B29C 70/443* (2013.01); *B29C 70/545* (2013.01); *B29D 99/0025* (2013.01); *F03D 1/0675* (2013.01); *B29C 2793/009* (2013.01); *B29L 2031/085* (2013.01); *F05B 2240/2211* (2013.01); *F05B 2240/311* (2013.01); *F05B 2260/96* (2013.01); *F05B 2280/6003* (2013.01); *Y02E 10/721* (2013.01); *Y02P 70/523* (2015.11)

(58) Field of Classification Search
CPC ......... A61F 13/15747; A61F 13/49011; Y10T 428/24752; Y10T 442/602; Y10T 156/10; Y10T 156/1044; Y10T 156/1084; Y10T 156/1066; Y10T 156/1082; Y10T 156/1052; B32B 2555/02; B32B 37/18; B32B 37/142; B32B 37/12; B32B 2307/726; B32B 2307/51; B32B 38/00
See application file for complete search history.

(56) References Cited

FOREIGN PATENT DOCUMENTS

| | | | | |
|---|---|---|---|---|
| EP | 2033769 A1 * | 3/2009 | ............. | B29C 65/40 |
| EP | 2033769 A1 | 3/2009 | | |
| WO | 9519500 A1 | 7/1995 | | |

\* cited by examiner

WIND TURBINE BLADE AND AN ASSOCIATED MANUFACTURING METHOD

This is a National Phase Application filed under 35 U.S.C. 371 as a national stage of PCT/EP2015/059184, filed Apr. 28, 2015, an application claiming the benefit of Great Britain Application No. 1407671.5, filed May 1, 2014, the content of each of which is hereby incorporated by reference in its entirety.

FIELD OF THE INVENTION

The present invention relates to a wind turbine blade having trailing edge arranged to reduce operational noise and a method of manufacturing such a wind turbine blade.

BACKGROUND OF THE INVENTION

Wind turbine blades are sometimes provided with trailing edge devices, in an effort to reduce the operational noise generated from the trailing edges of the blades during turbine operation. Such devices can include serrated panels or strips of bristles or flexible rods. However, such devices require secure attachment to the blade structure, and present challenges regarding suitable bonding techniques and acceptable distribution of loading forces.

PCT patent application publication number WO 95/19500 describes how a strip of reinforced fibres may be introduced between the two shell halves of a wind turbine blade during assembly, or laminated into the trailing edge end of a shell half. The strip of reinforced fibres is then arranged as a flexible trailing edge of the completed blade. However, such an approach requires that suitable strips of reinforced fibres are provided, and that the manufacturing process is adjusted to accommodate the incorporation of such strips into the blade assembly.

It is an object of the invention to provide a wind turbine blade and an associated method of manufacture that overcomes such issues.

SUMMARY OF THE INVENTION

Accordingly, there is provided a method of manufacturing a wind turbine blade comprising:
arranging a plurality of fibre layers in a mould surface;
infusing said plurality of fibre layers with a resin; and
curing said resin to form at least a portion of a fibre-composite blade structure,
wherein the method further comprises:
arranging a portion of said plurality of fibre layers such that said portion of said plurality of fibre layers are kept free from resin during said step of infusing, wherein said at least a portion of a fibre-composite blade structure comprises at least a section of a wind turbine blade trailing edge, wherein said portion of resin-free fibre layers forms a flexible fibre portion projecting from the wind turbine blade trailing edge section.

By arranging part of the fibre material used to form the blade structure to also form a flexible trailing edge fibre portion, a manufacturing method is provided which allows for ease of manufacture of wind turbine blades having noise-reducing trailing-edge components. In addition, as the flexible fibre trailing edge portion is provided as part of the blade structure during the moulding operation, the resultant blade does not require time-consuming post-moulding operations for the attachment of trailing edge devices. Furthermore, being an integral part of the blade structure, and formed from substantially the same material as the fibre used in the blade construction, the flexible fibre trailing edge portion is less likely to experience failure during the operation of the wind turbine blade.

It will be understood that said flexible fibre portion projecting from the trailing edge of the wind turbine blade is integral with at least one layer of fibre material in the blade structure. Preferably, the fibre material comprises glass fibre or carbon fibre or a hybrid material thereof.

Preferably, said at least a portion of a fibre-composite blade structure comprises a wind turbine blade shell, wherein the method further comprises the step of assembling said wind turbine blade shell with at least one other wind turbine blade shell to form a wind turbine blade having a fibre portion projecting from the trailing edge of said wind turbine blade. It will be understood that said at least one other wind turbine blade shell may also be provided with a projecting fibre portion, or said at least one other wind turbine blade shell may be manufactured according to any prior art method.

Preferably, said step of arranging comprises positioning an end of at least one fibre layer to extend over an edge of said mould surface.

As fibre material is generally provided as rolls of fabric, during layup of fibre material in a blade mould, the fibre material layers can be placed in the mould so that an end or an edge of the fibre material overlaps the mould edge, thereby lying outside of the effective mould surface.

Preferably, the method comprises arranging a sealing member over said plurality of fibre layers arranged in the mould surface to form an infusion cavity between said sealing member and said mould surface, and infusing said mould cavity with a resin.

Providing a sealing member, for example a vacuum bag, to form a vacuum cavity over the mould surface allows for the vacuum-assisted resin transfer moulding of the blade part.

Preferably, the method comprises the step of arranging a resin flow stopper along an edge of said mould surface, to prevent resin flow beyond said edge of said mould surface.

Accordingly, the sections of the fibre material lying outside of the blade mould are kept free of resin during the infusion process.

Preferably, said step of arranging a portion of said plurality of fibre layers to keep said portion free from resin comprises positioning a length of at least one of said fibre layers outside of a wind turbine blade, wherein the length of said at least one of said fibre layers is approximately 0.1-10% of the chord length of the wind turbine blade to be manufactured, further preferably approximately 5% of the chord.

It will be understood that the length of the projecting fibres may change along the length of the wind turbine blade, based on the length of the chord of the wind turbine blade profile along the length of the blade. For example, in one embodiment, for a section of a wind turbine blade having a chord length of approximately 1 m, the fibres project from the trailing edge of the blade by approximately 5 cm.

In one aspect, said portion of said plurality of fibre layers comprises a plurality of fibre layers, preferably between 2-10 fibre layers.

By providing a number of different fibre layers projecting from the trailing edge of the blade, the noise reduction or modulation of the wind turbine blade trailing edge can be improved, as different layers can be arranged to modulate different noise frequencies, e.g. by cutting said layers to different lengths, etc.

Preferably, the method comprises the step of cutting or trimming an end of said flexible fibre portion projecting from the wind turbine blade trailing edge section.

The freely-projecting fibre portion can be trimmed to provide for a particular length and/or projecting profile of the fibre portion.

There is also provided a wind turbine blade having a tip end and a root end and a leading edge and a trailing edge, wherein the wind turbine blade is formed as a fibre-composite structure where a plurality of layers of fibre material are provided in a cured resin matrix, wherein at least a portion of at least one layer of fibre material extends from the trailing edge of the fibre-composite structure, said portion of at least one layer of fibre material forming a flexible trailing edge projection at the trailing edge of said wind turbine blade.

Preferably, the wind turbine blade is manufactured according to any aspect of the method described above.

Preferably, said at least a portion of at least one layer of fibre material is integral with a layer of fibre material forming the fibre-composite blade structure. Preferably, said at least a portion comprises glass fibres, carbon fibres, or a hybrid thereof.

In an alternative aspect, a wind turbine blade may be formed using an integral moulding procedure, wherein fibre material is provided in a closed mould and infused with a resin to form a substantially complete wind turbine blade structure, wherein a portion of fibre material is arranged at a trailing edge of a closed mould for a wind turbine blade, said portion of fibre material provided in an isolated sealed enclosure to prevent ingress of resin during the moulding process.

DESCRIPTION OF THE INVENTION

Figure 2:
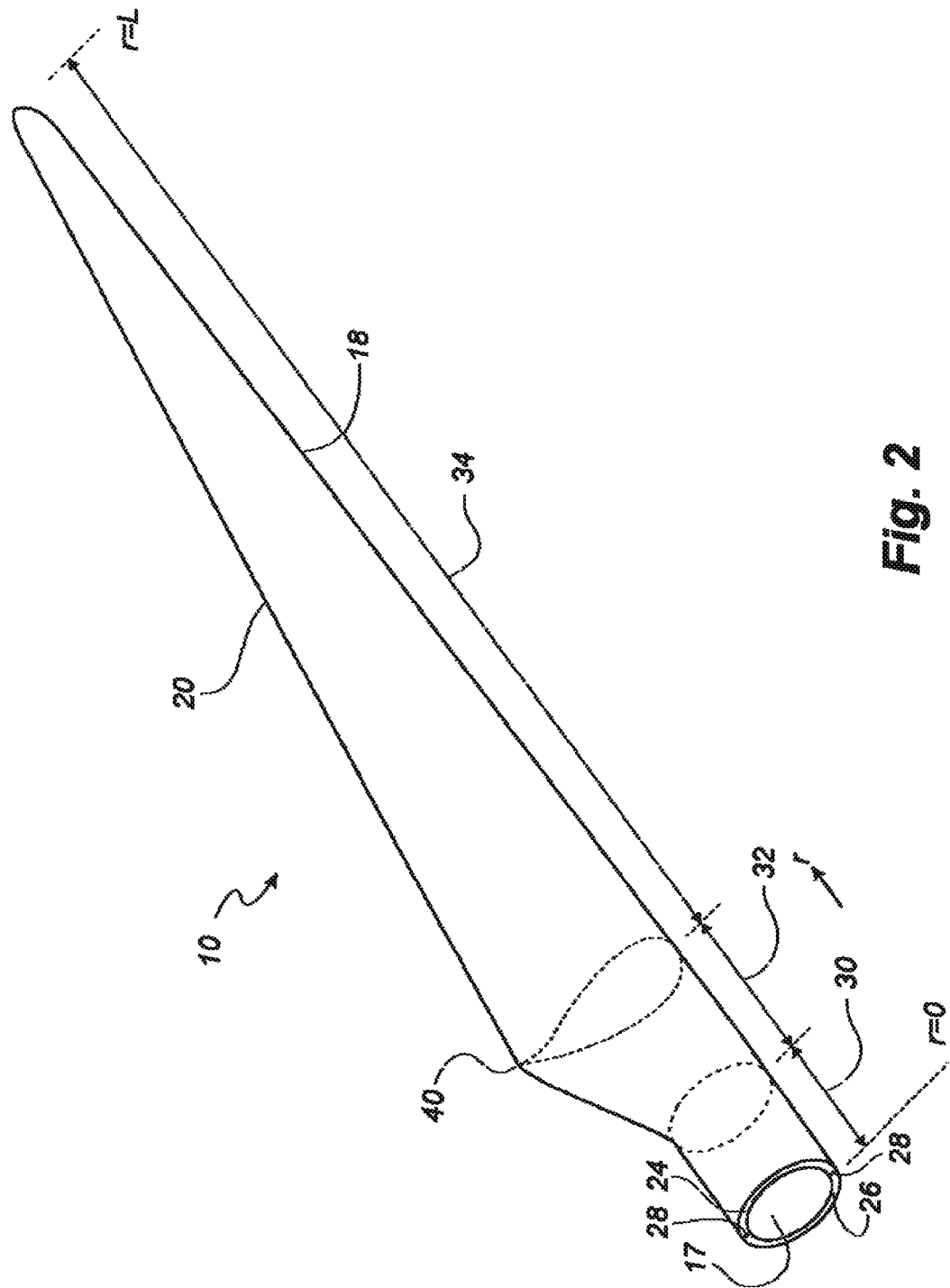
Figure 3:
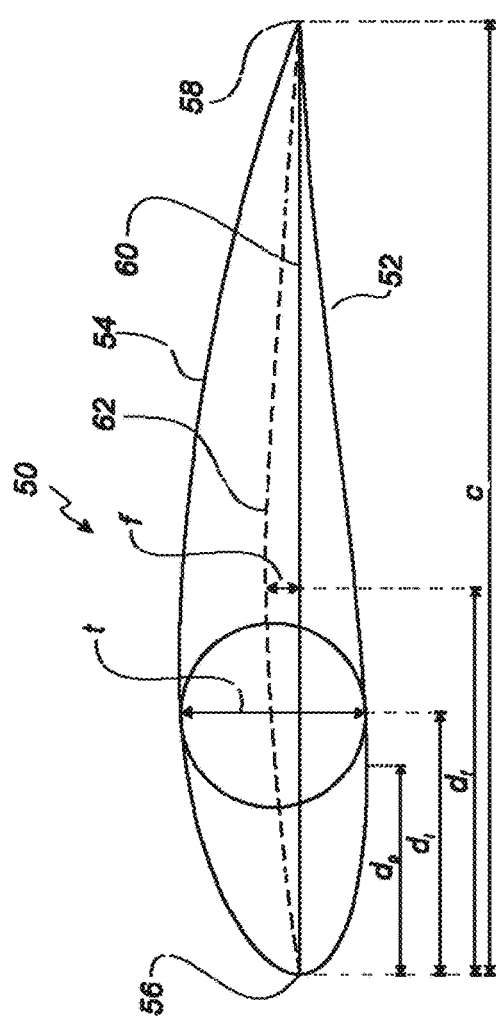
Figure 4:
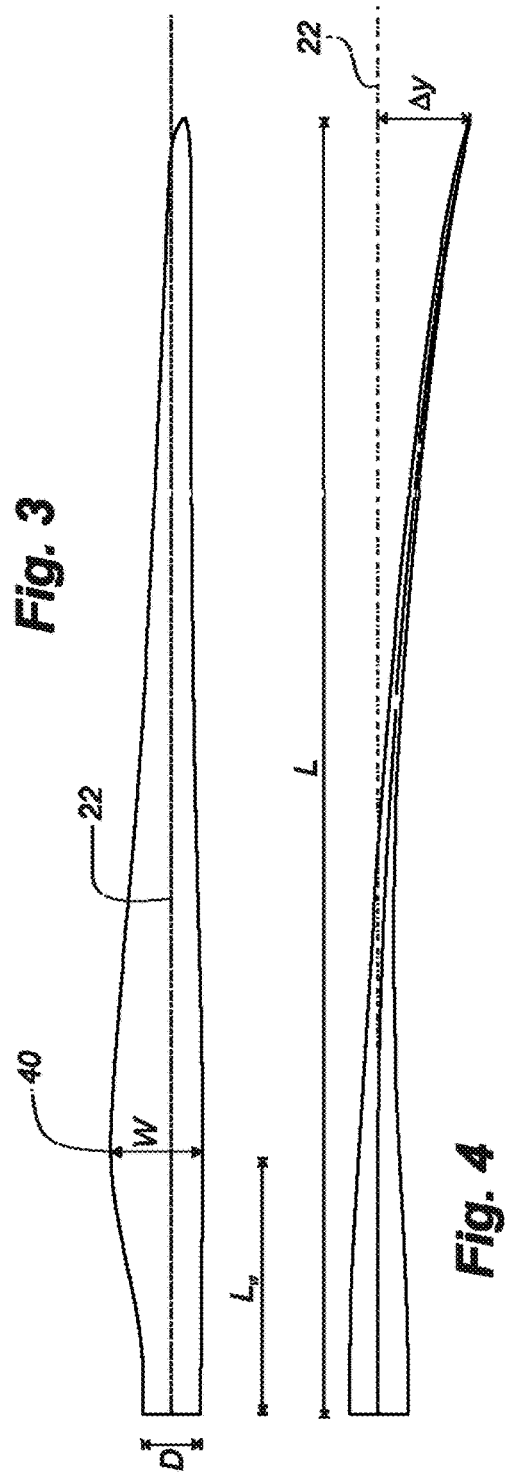
Figure 5A:
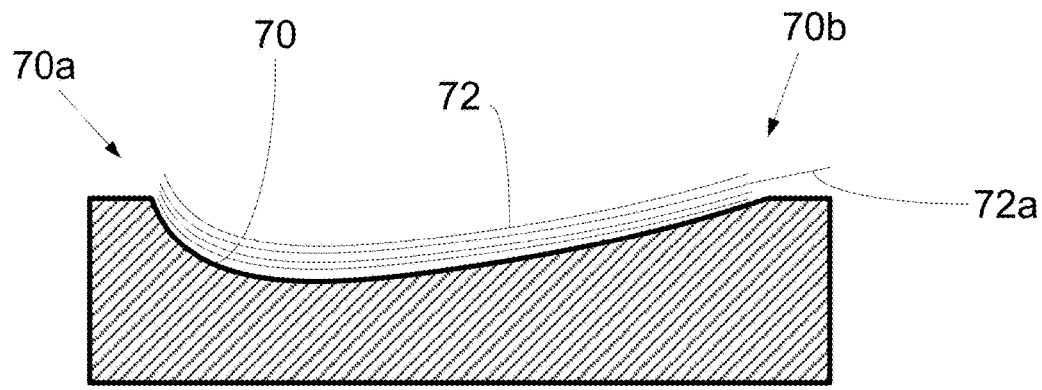
Figure 5B:
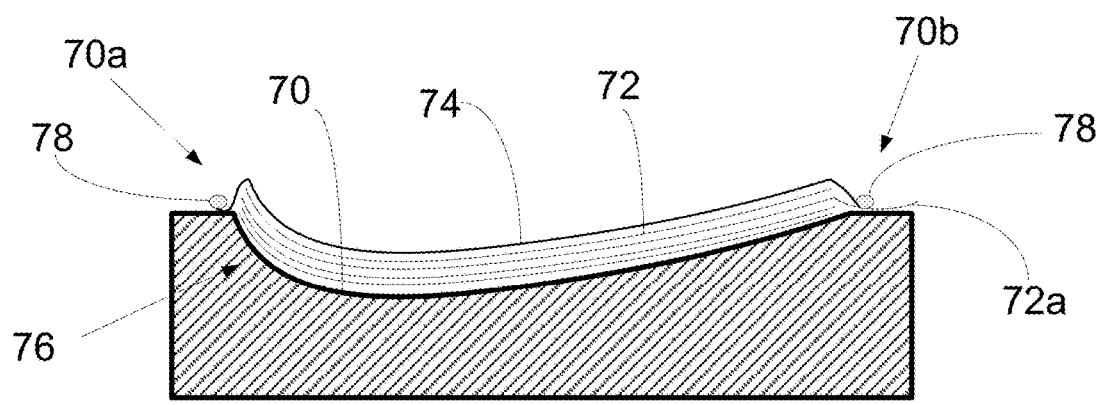
Figure 5C:
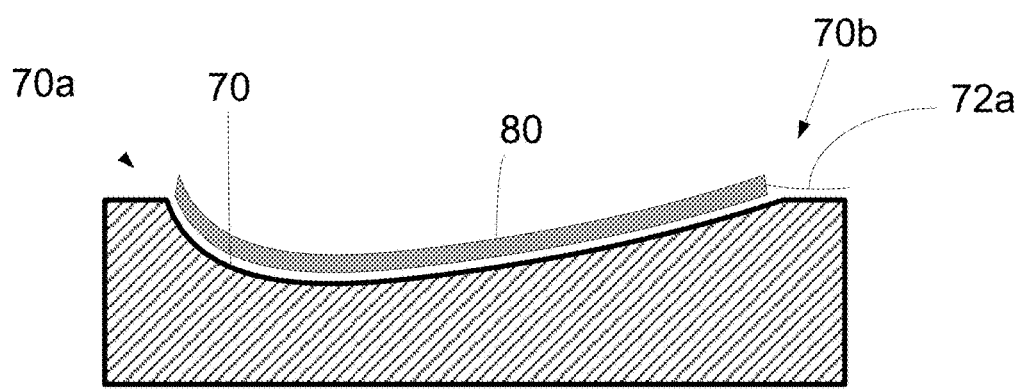

An embodiment of the invention will now be described, by way of example only, with reference to the accompanying drawings, in which:

FIG. 1 shows a wind turbine;
FIG. 2 shows a schematic view of a wind turbine blade according to the invention;
FIG. 3 shows a schematic view of an airfoil profile of the blade of FIG. 2;
FIG. 4 shows a schematic view of the wind turbine blade of FIG. 2, seen from above and from the side; and
FIGS. 5(a)-(c) illustrate the steps of a manufacturing method according to the invention.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows some other geometric parameters of the blade. The blade has a total blade length L. As shown in FIG. 2, the root end is located at position r=0, and the tip end located at r=L. The shoulder 40 of the blade is located at a position $r=L_w$, and has a shoulder width W, which equals the chord length at the shoulder 40. The diameter of the root is defined as D. Further, the blade is provided with a prebend, which is defined as Δy, which corresponds to the out of plane deflection from a pitch axis 22 of the blade.

The wind turbine blade 10 generally comprises a shell made of fibre-reinforced polymer, and is typically made as a pressure side or upwind shell part 24 and a suction side or downwind shell part 26 that are glued together along bond lines 28 extending along the trailing edge 20 and the leading edge 18 of the blade 10. Wind turbine blades are generally formed from fibre-reinforced plastics material, e.g. glass fibres and/or carbon fibres which are arranged in a mould and cured with a resin to form a solid structure. Modern wind turbine blades can often be in excess of 30 or 40 meters in length, having blade root diameters of several meters. Wind turbine blades are generally designed for relatively long lifetimes and to withstand considerable structural and dynamic loading.

With reference to FIG. 5(a), a mould surface 70 is provided during manufacture of a wind turbine blade, wherein the mould surface defines the desired geometry of the external surface of the wind turbine blade shell. The mould surface 70 comprises a leading edge 70a and a trailing edge 70b, corresponding to the respective leading and trailing edges of the wind turbine blade shell. Layers of fibre material 72 are laid up in the mould surface 70, to comply with the mould surface geometry. A portion 72a of at least one of the layers of fibre material 72 is arranged such that it extends beyond the edge of the mould surface 70, at the trailing edge 70b of the mould surface 70.

In FIG. 5(b), a vacuum bag or other sealing element 74 is applied above the layers of fibre material 72 and sealed against the sides of the mould surface 70, defining a mould cavity 76 between the sealing element 74 and the mould surface 70. The mould cavity 76 is arranged to receive a resin, e.g. a polyester, vinyl ester, or polyurethane resin.

A flow stopper 78 is used at the sides of the mould cavity 76, to prevent resin from escaping from the mould cavity 76. The flow stopper 78 may comprise a barrier formed by, e.g., an adhesive strip sealing the vacuum bag 74 to the underlying mould. The flow stopper 78 may additionally or alternatively comprise a member arranged to pinch a section of said portion 72a of at least one of the layers of fibre material 72 against the underlying mould, to prevent the egress of resin from the mould cavity 76 beyond said flow stopper 78. The flow stopper 78 acts to prevent resin reaching the portion 72a of at least one of the layers of fibre material 72 which projects beyond the trailing edge 70b of the mould surface 70.

Once the mould cavity 76 is sealed, a resin, e.g. polyester, vinyl ester, or polyurethane resin, is supplied to the cavity 76. The resin infuses the layers of fibre material 72 contained in the mould cavity 76, and is then cured or hardened to form a fibre-composite blade component 80, as seen in FIG. 5(c). The component 80 substantially forms a wind turbine blade half-shell, wherein a portion 72a of a layer of the fibre material used to form the component 80 extends, resin-free, from the trailing edge side of the component.

The component 80 may then be assembled with other blade components (not shown) to form a wind turbine blade. The provision of a layer of flexible fibre material at the trailing edge of the blade acts as a noise-reducing device, reducing the operational noise produced during operation of a wind turbine having the wind turbine blade. As the flexible fibre material is provided by an extension of at least one layer of the fibre material used to form the blade component, the flexible fibre material at the trailing edge is securely anchored to the structure of the wind turbine blade. Furthermore, a wind turbine blade comprising a trailing edge flexible fibre layer can be manufactured using relatively simple alterations to the existing manufacturing processes.

After manufacture of the component 80 and/or the subsequent assembly to form a wind turbine blade, the portion 72a of fibre material can be processed as required. For example, the portion 72a of fibre material can be cut or trimmed to a desired length and/or pattern.

Preferably, the layers of fibre material are position such that the flexible fibre layer projecting from the trailing edge of the blade has a length corresponding to between approximately 0.1-10% of the chord length of the wind turbine blade profile along the length of the blade, further preferably approximately 5% of the chord length. In addition, it will be understood that the blade may be manufactured wherein the flexible fibre layer projecting from the trailing edge of the blade may extend along a portion of the length of the blade, preferably at least a portion of the outboard section of the blade.

It will be understood that while the invention is described in terms of the half-mould embodiment shown above, the invention may be applied to any suitable construction process, e.g. using an integral or one-shot moulding process, for example wherein at least a portion of a fibre layer used in the construction of a wind turbine blade components is retained in a sealed or isolated pouch or enclosure, to keep said portion resin-free during the infusion process.

It will be understood that a plurality of layers of fibre material 72 may be arranged such that a plurality of portions of said fibre layers projects from the trailing edge of the component 80. Such layers may be arranged such that the projecting portions of the different layers project by different lengths from the trailing edge, which may provide each projecting portion with different noise modulation characteristics.

The invention is not limited to the embodiment described herein, and may be modified or adapted without departing from the scope of the present invention.

The invention claimed is:

1. A method of manufacturing a wind turbine blade comprising the steps of:
   arranging a plurality of fiber layers in a mould surface;
   infusing said plurality of fiber layers with a resin; and
   curing said resin to form at least a portion of a fiber-composite blade structure, wherein the method further comprises:
   arranging a portion of said plurality of fiber layers and keeping said portion of said plurality of fiber layers free from resin during said step of infusing, defining a portion of resin-free fiber layers, wherein said at least a portion of a fiber-composite blade structure comprises at least a section of a wind turbine blade trailing edge, wherein said portion of resin-free fiber layers forms a flexible fiber portion projecting from the at least a section of the wind turbine blade trailing edge.

2. The method of claim 1, wherein said at least a portion of a fiber-composite blade structure comprises a wind turbine blade shell, wherein the method further comprises the step of assembling said wind turbine blade shell with at least one other wind turbine blade shell to form the wind turbine blade, wherein the flexible fiber portion projects from the trailing edge of said wind turbine blade.

3. The method of claim 1, wherein said step of arranging comprises positioning an end of at least one fiber layer to extend over an edge of said mould surface.

4. The method of claim 1, wherein the method comprises arranging a sealing member over said plurality of fiber layers arranged in the mould surface to form a mould cavity between said sealing member and said mould surface, and infusing said mould cavity with the resin.

5. The method of claim 1, wherein the method comprises the step of arranging a resin flow stopper along an edge of said mould surface, to prevent resin flow beyond said edge of said mould surface.

6. The method of claim 1, wherein said step of arranging a portion of said plurality of fiber layers to keep said portion free from resin comprises positioning a length of at least one of said fiber layers outside of the wind turbine blade, wherein the length of said at least one of said fiber layers is approximately 0.1-10% of a chord length of the wind turbine blade to be manufactured.

7. The method of claim 1, wherein said portion of said plurality of fiber layers comprises between 2-10 fiber layers.

8. The method of claim 1, wherein the method comprises the step of cutting or trimming an end of said flexible fiber portion projecting from the wind turbine blade trailing edge section.

9. The method of claim 6, wherein the length of said at least one of said fiber layers is approximately 5% of the chord length of the wind turbine blade to be manufactured.

* * * * *